United States Patent
Ding et al.

(10) Patent No.: US 9,981,688 B2
(45) Date of Patent: May 29, 2018

(54) STEERING SYSTEM AND INDEPENDENT SUSPENSION WHEEL-TYPE HEAVY VEHICLE

(71) Applicant: XUZHOU HEAVY MACHINERY CO., LTD., Xuzhou (CN)

(72) Inventors: Honggang Ding, Xuzhou (CN); Zhifang Wang, Xuzhou (CN); Yunwang Ma, Xuzhou (CN); Baoluan Liu, Xuzhou (CN); Shuyuan Cao, Xuzhou (CN); Pengcheng Lu, Xuzhou (CN)

(73) Assignee: XUZHOU HEAVY MACHINERY CO., LTD., Xuzhou (CN)

( * ) Notice: Subject to any disclaimer, the term of this patent is extended or adjusted under 35 U.S.C. 154(b) by 0 days. days.

(21) Appl. No.: 14/780,822

(22) PCT Filed: May 20, 2014

(86) PCT No.: PCT/CN2014/077860
§ 371 (c)(1),
(2) Date: Sep. 28, 2015

(87) PCT Pub. No.: WO2015/024399
PCT Pub. Date: Feb. 26, 2015

(65) Prior Publication Data
US 2017/0137058 A1     May 18, 2017

(51) Int. Cl.
*B62D 7/14* (2006.01)
*B62D 3/14* (2006.01)
(Continued)

(52) U.S. Cl.
CPC .............. *B62D 7/144* (2013.01); *B62D 3/14* (2013.01); *B62D 5/065* (2013.01); *B62D 5/08* (2013.01); *B62D 5/26* (2013.01)

(58) Field of Classification Search
CPC .......... B62D 7/144; B62D 3/14; B62D 5/065; B62D 5/08; B62D 5/26
(Continued)

(56) References Cited

U.S. PATENT DOCUMENTS

| | | | | |
|---|---|---|---|---|
| 1,709,741 A | * | 4/1929 | Romine ................. | B62D 7/144 180/24 |
| 3,486,576 A | * | 12/1969 | Breon ..................... | B62D 5/09 180/24.01 |

(Continued)

FOREIGN PATENT DOCUMENTS

| | | |
|---|---|---|
| CN | 201305027 Y | 9/2009 |
| CN | 102030035 A | 4/2010 |

(Continued)

OTHER PUBLICATIONS

Office Action dated May 20, 2014 in the corresponding RU Application (Application No. 2015141800/11) with English translation.
(Continued)

*Primary Examiner* — Jacob D Knutson
(74) *Attorney, Agent, or Firm* — Kilpatrick Townsend & Stockton LLP

(57) ABSTRACT

The present invention relates to a steering system and an independent suspension wheel-type heavy vehicle. The steering system comprises a steering mechanism for providing a steering force to wheels and a steering hydraulic assisting system for providing a steering assisting force overcoming a steering resistance moment from the ground to the wheels. According to the invention, by providing the steering mechanism for providing a steering force to wheels and by providing the steering hydraulic assisting system for providing a steering assisting force overcoming a steering resistance moment from the ground to the wheels, the steering resistance moment from the ground can be effectively overcome, and the vehicle is offered the steering (Continued)

capability for various places, as compared with a steering system only depending on the torque output by a steering gear or only depending on the torque output by the steering gear and a steering assisting follower.

16 Claims, 4 Drawing Sheets

(51) Int. Cl.
  *B62D 5/065* (2006.01)
  *B62D 5/08* (2006.01)
  *B62D 5/26* (2006.01)

(58) Field of Classification Search
  USPC ............................................................ 180/414
  See application file for complete search history.

(56) References Cited

U.S. PATENT DOCUMENTS

| | | | |
|---|---|---|---|
| 5,435,407 A | | 7/1995 | Renfroe |
| 6,059,056 A | * | 5/2000 | Becker ................. B62D 7/1509 180/24.01 |
| 6,374,940 B1 | * | 4/2002 | Picket ...................... B62D 5/30 180/405 |
| 8,419,032 B1 | * | 4/2013 | McGhie ................. B62D 13/04 280/100 |
| 2006/0185926 A1 | * | 8/2006 | Simard ................. B62D 7/144 180/409 |
| 2008/0116001 A1 | * | 5/2008 | Graeve .................. B62D 5/093 180/441 |
| 2009/0236823 A1 | * | 9/2009 | Prem .................... B62D 13/005 280/426 |
| 2014/0367188 A1 | * | 12/2014 | Johnson ............... B62D 7/1563 180/414 |

FOREIGN PATENT DOCUMENTS

| | | |
|---|---|---|
| CN | 201961369 U | 9/2011 |
| CN | 102673639 A | 9/2012 |
| CN | 202529027 U | 11/2012 |
| CN | 202669912 U | 1/2013 |
| CN | 102923187 A | 2/2013 |
| CN | 103738136 A | 4/2014 |
| CN | 103963825 A | 8/2014 |
| DE | 2127918 A1 | 12/1971 |
| EA | 001082 B1 | 10/2000 |
| FR | 1479023 A | 4/1967 |
| RU | 2464194 C1 | 10/2012 |
| SU | 1126482 A1 | 11/1984 |

OTHER PUBLICATIONS

The first Office Action dated Oct. 23, 2015 in the CN priority application 201410214719.5.
International Search Report and Written Opinion of PCT/CN2014/077860.
European Search Report dated Sep. 22, 2017 corresponding to European Application No. 14838036.3.

* cited by examiner

STEERING SYSTEM AND INDEPENDENT SUSPENSION WHEEL-TYPE HEAVY VEHICLE

FIELD OF THE INVENTION

The present invention relates to the field of engineering machinery, in particular to a steering system and an independent suspension wheel-type heavy vehicle with the steering system.

BACKGROUND OF THE INVENTION

Currently, most wheel-type heavy vehicles have a non-independent suspension with leaf springs and an oil-gas suspension as elastic elements, wherein left and right wheels of the non-independent suspension and tires thereof are fastened to a same axle and are connected to a vehicle frame or a vehicle body through the suspension. As such, the impact load transferred to the vehicle body from the ground cannot be effectively attenuated by the suspension, and hopping up and down of the two wheels can cause the vehicle to be tilted.

As to an independent suspension vehicle, its unsprung weight is low, and the impact load applied to the suspension and transferred to the vehicle body is relatively small, which is favorable to improving the ride comfort of the vehicle and ground contact performance of the tires; and hopping of the left and right wheels has no direct mutual influence, so tilting and vibration of the vehicle body can be reduced. At present, a suspension structure for an all-terrain crane chassis has been gradually replaced by an independent suspension structure. As an oil-gas independent suspension device has very good nonlinearity, the two wheels can move separately without mutual influence, the vehicle ride comfort is improved, and it can ensure that the vehicle has good ride comfort during no-load driving and full-load driving. Thus, independent suspension technology has been gradually applied to wheel-type heavy vehicles with high requirement on off-road performance.

In the case of an independent suspension vehicle, to ensure that each directive wheel may move independently relative to the vehicle frame without being influenced by the directive wheel on the other side of the same axle, a trapezoidal tie rod in a steering trapezoidal mechanism should be disconnected-type when a steering trapezoidal arm hops up and down along with a steering knuckle/axle wheel side, to reduce movement interference between the steering trapezoidal mechanism and a suspension guide mechanism.

Among those disconnected steering trapezoidal mechanisms available at present, some only depend on a torque output by one or more steering gears to drive left/right wheels of the vehicle for steering, and some depend on a torque provided by one steering gear and one steering assisting follower to drive the left/right wheels of the vehicle for steering. The disconnected steering trapezoidal mechanism described above only depending on the torque output by the steering gear or only depending on the torque output by the steering gear and the steering assisting follower to overcome a steering resistance moment from the ground is only suitable for motor off-road vehicles with a relatively low weight. There is not yet a relatively perfect steering system for a wheel-type heavy vehicle with high requirement on off-road performance.

SUMMARY OF THE INVENTION

An object of the present invention is to provide a steering system and an independent suspension wheel-type heavy vehicle, by means of which a steering resistance moment from the ground can be effectively overcome, and the vehicle has the steering capability for various places.

To this end, the following technical solutions are adopted in embodiments of the present inventions:

The present invention provides a steering system, including a steering mechanism for providing a steering force to wheels and a steering hydraulic assisting system for providing a steering assisting force overcoming a steering resistance moment from the ground to the wheels.

In a preferred or alternative embodiment, the steering mechanism includes a steering output mechanism for outputting a torque; the steering output mechanism is connected to a trapezoidal mechanism of one axle, or is successively connected to trapezoidal mechanisms of multiple axles; through the trapezoidal mechanism, the steering output mechanism provides a torque to a wheel at the left side and a wheel at the right side of the related axle; and the steering hydraulic assisting system includes a steering assisting oil cylinder that provides a steering assisting force to a wheel at the left side and/or a wheel at the right side of the related axle, and a hydraulic oil circuit and a valve control device corresponding to the steering assisting oil cylinder.

In a preferred or alternative embodiment, the steering output mechanism is connected to a trapezoidal mechanism of one axle, the trapezoidal mechanism of the axle being a disconnected trapezoidal mechanism, which includes a left wheel steering mechanism and a right wheel steering mechanism that correspondingly provide a torque to the wheel at the left side and the wheel at the right side of the axle respectively; the right wheel steering mechanism and the left wheel steering mechanism are connected by a pull rod assembly; and the left wheel steering mechanism or the right wheel steering mechanism is connected with the steering output mechanism by a connecting rod assembly and power is transferred therebetween.

In a preferred or alternative embodiment, each of the left wheel steering mechanism and the right wheel steering mechanism includes a trapezoidal arm and a transitional rocker arm; the trapezoidal arm and the transitional rocker arm are connected by a pull rod assembly and power is transferred therebetween; the transitional rocker arm of the left wheel steering mechanism and the transitional rocker arm of the right wheel steering mechanism are connected by a pull rod assembly and power is transferred therebetween; and the transitional rocker arm of the left wheel steering mechanism or the transitional rocker arm of the right wheel steering mechanism is connected with the steering output mechanism by a connecting rod assembly and power is transferred therebetween.

In a preferred or alternative embodiment, the steering output mechanism is successively connected to trapezoidal mechanisms of multiple axles, each of the trapezoidal mechanisms of the multiple axles being a disconnected trapezoidal mechanism, which includes a left wheel steering mechanism and a right wheel steering mechanism that correspondingly provide a torque to the wheel at the left side and the wheel at the right side of the related axle respectively; the right wheel steering mechanism and the left wheel steering mechanism are connected by a pull rod assembly; the left wheel steering mechanism or the right wheel steering mechanism of the disconnected trapezoidal mechanism adjacent to the steering output mechanism is connected with the steering output mechanism by a connecting rod assembly and power is transferred therebetween; and the disconnected trapezoidal mechanisms on adjacent axles of the multiple axles are connected by a pull rod assembly and power is transferred therebetween.

In a preferred or alternative embodiment, each of the left wheel steering mechanism and the right wheel steering mechanism includes a trapezoidal arm and a transitional rocker arm; the trapezoidal arm and the transitional rocker arm are connected by a pull rod assembly and power is transferred therebetween; the transitional rocker arm of the left wheel steering mechanism and the transitional rocker arm of the right wheel steering mechanism are connected by a pull rod assembly and power is transferred therebetween; the transitional rocker arm of the left wheel steering mechanism or the transitional rocker arm of the right wheel steering mechanism of the disconnected trapezoidal mechanism adjacent to the steering output mechanism is connected with the steering output mechanism by a connecting rod assembly and power is transferred therebetween; the transitional rocker arms of the left wheel steering mechanisms or the transitional rocker arms of the right wheel steering mechanisms on adjacent axles of the multiple axles are connected by a pull rod assembly and power is transferred therebetween.

In a preferred or alternative embodiment, a steering assisting oil cylinder is arranged on the transitional rocker arm of the left wheel steering mechanism and/or the transitional rocker arm of the right wheel steering mechanism on at least one axle.

In a preferred or alternative embodiment, each of the connecting rod assemblies and the steering assisting oil cylinders is configured to be connected by means of a spherical hinge.

In a preferred or alternative embodiment, the steering output mechanism includes an angle drive, a steering drive shaft, a steering gear, a first pull rod assembly, a first rocker arm assembly and a second pull rod assembly; one end of the steering drive shaft is connected with the angle drive, and the other end thereof is connected with an input shaft of the steering gear; a steering plumbing arm is arranged on an output shaft of the steering gear; the steering plumbing arm is connected with one end of the first pull rod assembly, and the other end of the first pull rod assembly is connected with one end of the first rocker arm assembly; and the other end of the first rocker arm assembly is connected with one end of the second pull rod assembly by means of a spherical hinge, and the other end of the second pull rod assembly is connected with the trapezoidal mechanism on the adjacent axle by means of a spherical hinge.

In a preferred or alternative embodiment, the steering assisting oil cylinder is supplied with oil through at least one steering pump, and steering gears for changing over the flow direction of pressure oil are provided on hydraulic oil circuits between the steering assisting oil cylinder and the steering pump and between the steering assisting oil cylinder and an oil tank.

In a preferred or alternative embodiment, on the hydraulic oil circuit of the steering assisting oil cylinder are also provided an emergency pump and a switching valve for switching between an oil supply circuit of the emergency pump and an oil supply circuit of the steering pump.

In a preferred or alternative embodiment, both the steering mechanism and the steering hydraulic assisting system are used for providing a steering force and a steering assisting force to wheels of a front axle, and the steering system further includes a rear axle steering control device for providing a steering force to wheels on a rear axle.

In a preferred or alternative embodiment, the rear axle steering control device includes a trapezoidal mechanism and a hydraulic power system providing a steering force to the trapezoidal mechanism.

In a preferred or alternative embodiment, the trapezoidal mechanism is a disconnected trapezoidal mechanism, which includes a left wheel steering mechanism and a right wheel steering mechanism that correspondingly provide a torque to the wheel at the left side and the wheel at the right side of the rear axle respectively; the right wheel steering mechanism and the left wheel steering mechanism are connected by a pull rod assembly; the hydraulic power system includes a steering oil cylinder arranged on the left wheel steering mechanism and/or the right wheel steering mechanism, and a hydraulic oil circuit and a valve control device corresponding to the steering oil cylinder.

In a preferred or alternative embodiment, each of the left wheel steering mechanism and the right wheel steering mechanism includes a trapezoidal arm and a transitional rocker arm; the trapezoidal arm and the transitional rocker arm are connected by a pull rod assembly and power is transferred therebetween; the transitional rocker arm of the left wheel steering mechanism and the transitional rocker arm of the right wheel steering mechanism are connected by a pull rod assembly and power is transferred therebetween; and the steering oil cylinder is provided on the transitional rocker arm of the left wheel steering mechanisms and/or the transitional rocker arm of the right wheel steering mechanism.

In a preferred or alternative embodiment, the steering oil cylinder is supplied with oil through a variable displacement pump; proportional valve sets for changing over the flow direction of pressure oil are provided on hydraulic oil circuits between the steering oil cylinder and the variable displacement pump and between the steering oil cylinder and an oil tank; and reversal of the oil circuit is controlled by the proportional valve set, to achieve left steering or right steering of the rear axle.

In a preferred or alternative embodiment, on a hydraulic oil circuit between a working oil port of the proportional valve set and a working cavity of the steering oil cylinder is also provided a lock valve set for controlling on and off states of the hydraulic oil circuit between the working oil port of the proportional valve set and the working cavity of the steering oil cylinder.

In a preferred or alternative embodiment, the lock valve set includes a two-position two-way solenoid valve, an overflow valve and a check valve, wherein an oil inlet of the two-position two-way solenoid valve is communicated with the working oil port of the proportional valve set; an oil outlet of the two-position two-way solenoid valve is communicated with an oil outlet of the check valve, an oil inlet of the overflow valve and the working cavity of the steering oil cylinder; and an oil outlet of the overflow valve and an oil inlet of the check valve are both communicated with an oil tank.

In a preferred or alternative embodiment, on the hydraulic circuits between the steering oil cylinder and the variable displacement pump and between the steering oil cylinder and an oil tank is also provided a bypass circuit for the proportional valve set for manually or automatically adjusting the rear axle in failure to a steering neutral state after failure occurs to the proportional valve set; and a three-position four-way solenoid valve is provided on the bypass circuit.

To achieve the above object, the present invention further provides an independent suspension wheel-type heavy vehicle, which includes a steering system in any of the above embodiments.

Based on the above technical solutions, the present invention has at least the following beneficial effects:

According to the invention, by providing the steering mechanism for providing a steering force to wheels and by providing the steering hydraulic assisting system for providing a steering assisting force overcoming a steering resistance moment from the ground to the wheels, the steering resistance moment from the ground can be effectively overcome, and the vehicle is offered the steering capability for various places, as compared with a steering system only depending on the torque output by a steering gear or only depending on the torque output by the steering gear and a steering assisting follower.

BRIEF DESCRIPTION OF THE DRAWINGS

Drawings illustrated herein are used for providing further understanding of the present invention and form part of the present application, and illustrative embodiments of the present invention and description thereof are intended for explaining instead of improperly limiting the present invention. In the drawings.

Figure 1:
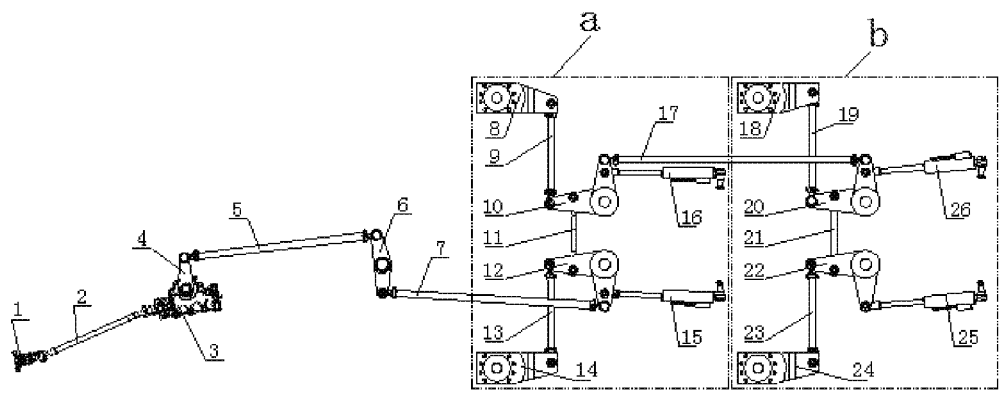
FIG. 1 is a structure diagram of a steering system of the present invention.

In the drawings:
1—angle drive; 2—steering drive shaft; 3—steering gear; 4—steering plumbing arm; 5—first pull rod assembly; 6—first rocker arm assembly; 7—second pull rod assembly; 8—first axle right trapezoidal arm; 9—third pull rod assembly; 10—first axle right transitional rocker arm; 11—fourth pull rod assembly; 12—first axle left transitional rocker arm; 13—fifth pull rod assembly; 14—first axle left trapezoidal arm; 15—first axle left steering assisting oil cylinder; 16—first axle right steering assisting oil cylinder; 17—sixth pull rod assembly; 18—second axle right trapezoidal arm; 19—seventh pull rod assembly; 20—second axle right transitional rocker arm; 21—eighth pull rod assembly; 22—second axle left transitional rocker arm; 23—ninth pull rod assembly; 24—second axle left trapezoidal arm; 25—second axle left steering assisting oil cylinder; 26—second axle right steering assisting oil cylinder; 101—emergency pump; 102—first steering pump; 103—second steering pump; 104—switching valve; 201—variable displacement pump; 202—filter; 203—proportional valve set; 204—first lock valve set; 205—second lock valve set; 206—third lock valve set; 207—fourth lock valve set; 208—left steering oil cylinder; 209—right steering oil cylinder; 210—rear axle left transitional rocker arm; 211—rear axle right transitional rocker arm; 212—middle transitional pull rod assembly; 213—left steering pull rod assembly; 214—right steering pull rod assembly; 215—rear axle left trapezoidal arm; 216—rear axle right trapezoidal arm; 219—three-position four-way solenoid valve; 301—two-position two-way solenoid valve; 302—check valve; 303—overflow valve; 401—left/right oil-gas suspension oil cylinder; 402—left/right wheel side; 403—left/right thrust rod; 404—left/right steering assisting oil cylinder; 405—left/right transitional arm; 406—left/right pull rod assembly; 407—left/right trapezoidal arm.

DETAILED DESCRIPTION OF THE EMBODIMENTS

Technical solutions in the embodiments will be described below clearly and completely in conjunction with the accompanying drawings in the embodiments of the present invention. Obviously, the described embodiments are only part of, instead of all of embodiments of the present invention. Based on the embodiments of the present invention, all of other embodiments obtained by a person of ordinary skill in the art without creative work should fall into the protection scope of the present invention.

In description of the present invention, it needs to be understood that orientation or positional relations indicated by the terms "central", "longitudinal", "transverse", "front", "rear", "left", "right", "vertical", "horizontal", "top", "bottom", "inner", "outer" and the like are based on orientation or positional relations indicated by the drawings, and such terms are only intended to facilitate describing the present invention and simplify description, rather than indicating or suggesting that the devices or elements denoted thereby must have specific orientations, or be configured and operated in specific orientations, and thus shall not be construed as limiting the protection scope of the present invention.

First, technical terms in the present invention are explained.

Independent suspension: so called due to the structural characteristics that axles are designed to be disconnected, so that wheels at each side may be separately connected to a vehicle frame (or vehicle body) through an elastic suspension, and wheels at both sides may hop separately, without influencing each other.

Integral trapezoidal mechanism: a trapezoidal mechanism of which a steering tie rod is an integral type.

Disconnected trapezoidal mechanism: a trapezoidal mechanism of which a steering tie rod is a segmented type.

A steering system of the present invention mainly includes a steering mechanism for providing a steering force to wheels and a steering hydraulic assisting system for providing a steering assisting force overcoming a steering resistance moment from the ground to the wheels. The steering assisting force provided by the steering hydraulic assisting system to the steering mechanism is large, so that the steering resistance moment from the ground can be effectively overcome, so as to be applicable to wheel-type heavy vehicles with high requirement on off-road performance.

The steering mechanism of the present invention may include a steering output mechanism for outputting a torque. The steering output mechanism may be only connected to a trapezoidal mechanism of one axle, or may be successively connected to trapezoidal mechanisms of multiple axles (as shown in FIG. 1, the steering output mechanism is successively connected to trapezoidal mechanisms of two axles), to achieve steering of one or more axles. Through the trapezoidal mechanism, the steering output mechanism provides a torque to a wheel at the left side and a wheel at the right side of the related axle; and the steering hydraulic assisting system may include a steering assisting oil cylinder that provides a steering assisting force to a wheel at the left side and/or a wheel at the right side of the related axle, and a hydraulic oil circuit and a valve control device corresponding to the steering assisting oil cylinder.

The trapezoidal mechanism of the axle described above may be a disconnected trapezoidal mechanism, which can ensure that each wheel is not influenced by hopping up and down of the wheel at the other side, a uniform steering force is provided to each wheel, and the vehicle is offered the steering capability for various places.

When the steering output mechanism is only connected to a disconnected trapezoidal mechanism of one axle, the disconnected trapezoidal mechanism may include a left wheel steering mechanism and a right wheel steering mechanism that correspondingly provide a torque to the wheel at the left side and the wheel at the right side of the axle respectively. The right wheel steering mechanism and the left wheel steering mechanism may be connected by a pull rod assembly, and the left wheel steering mechanism or the right wheel steering mechanism may be connected with the steering output mechanism by a connecting rod assembly and power is transferred therebetween.

Each of the left wheel steering mechanism and the right wheel steering mechanism may include a trapezoidal arm and a transitional rocker arm. The trapezoidal arm and the transitional rocker arm may be connected by a pull rod assembly and power is transferred therebetween. The transitional rocker arm of the left wheel steering mechanism and the transitional rocker arm of the right wheel steering mechanism may be connected by a pull rod assembly and power is transferred therebetween. The transitional rocker arm of the left wheel steering mechanism or the transitional rocker arm of the right wheel steering mechanism may be connected with the steering output mechanism by a connecting rod assembly and power is transferred therebetween.

When the steering output mechanism is successively connected to disconnected trapezoidal mechanisms of multiple axles, each of the disconnected trapezoidal mechanisms may include a left wheel steering mechanism and a right wheel steering mechanism that correspondingly provide a torque to the wheel at the left side and the wheel at the right side of the related axle respectively. The right wheel steering mechanism and the left wheel steering mechanism may be connected by a pull rod assembly. The left wheel steering mechanism or the right wheel steering mechanism of the disconnected trapezoidal mechanism adjacent to the steering output mechanism may be connected with the steering output mechanism by a connecting rod assembly and power is transferred therebetween. The disconnected trapezoidal mechanisms on adjacent axles of the multiple axles may be connected by a pull rod assembly and power is transferred therebetween.

Each of the left wheel steering mechanism and the right wheel steering mechanism may include a trapezoidal arm and a transitional rocker arm. The trapezoidal arm and the transitional rocker arm may be connected by a pull rod assembly and power is transferred therebetween. The transitional rocker arm of the left wheel steering mechanism and the transitional rocker arm of the right wheel steering mechanism may be connected by a pull rod assembly and power is transferred therebetween. The transitional rocker arm of the left wheel steering mechanism or the transitional rocker arm of the right wheel steering mechanism of the disconnected trapezoidal mechanism adjacent to the steering output mechanism may be connected with the steering output mechanism by a connecting rod assembly and power is transferred therebetween. The transitional rocker arms of the left wheel steering mechanisms or the transitional rocker arms of the right wheel steering mechanisms on adjacent axles of the multiple axles may be connected by a pull rod assembly and power is transferred therebetween.

FIG. 1 shows a specific embodiment in which a steering output mechanism is successively connected to disconnected trapezoidal mechanisms of multiple axles respectively. In this embodiment, the steering output mechanism is successively connected to two disconnected trapezoidal mechanisms, namely a first axle disconnected trapezoidal mechanism a, and a second axle disconnected trapezoidal mechanism b respectively.

As shown in FIG. 1, the first axle disconnected trapezoidal mechanism a includes a first axle right trapezoidal arm 8, a third pull rod assembly 9, a first axle right transitional rocker arm 10, a fourth pull rod assembly 11, a first axle left transitional rocker arm 12, a fifth pull rod assembly 13 and a first axle left trapezoidal arm 14. One end of the third pull rod assembly 9 is connected with the first axle right trapezoidal arm 8 by means of a spherical hinge, and the other end of the third pull rod assembly 9 is connected with the first axle right transitional rocker arm 10 by means of a spherical hinge; one end of the fourth pull rod assembly 11 is connected with the first axle right transitional rocker arm 10 by means of a spherical hinge, and the other end of the fourth pull rod assembly 11 is connected with the first axle left transitional rocker arm 12 by means of a spherical hinge; and one end of the fifth pull rod assembly 13 is connected with the first axle left trapezoidal arm 14 by means of a spherical hinge, and the other end of the fifth pull rod assembly 13 is connected with the first axle left transitional rocker arm 12 by means of a spherical hinge.

As shown in FIG. 1, the second axle disconnected trapezoidal mechanism b includes a second axle right trapezoidal arm 18, a seventh pull rod assembly 19, a second axle right transitional rocker arm 20, an eighth pull rod assembly 21, a second axle left transitional rocker arm 22, a ninth pull rod assembly 23 and a second axle left trapezoidal arm 24. One end of the seventh pull rod assembly 19 is connected with the second axle right trapezoidal arm 18 by means of a spherical hinge, and the other end of the seventh pull rod assembly 19 is connected with the second axle right transitional rocker arm 20 by means of a spherical hinge; one end of the eighth pull rod assembly 21 is connected with the second axle right transitional rocker arm 20 by means of a spherical hinge, and the other end of the eighth pull rod assembly 21 is connected with the second axle left transitional rocker arm 22 by means of a spherical hinge; and one end of the ninth pull rod assembly 23 is connected with the second axle left trapezoidal arm 24 by means of a spherical hinge, and the other end of the ninth pull rod assembly 23 is connected with the second axle left transitional rocker arm 22 by means of a spherical hinge.

The first axle disconnected trapezoidal mechanism a and the second axle disconnected trapezoidal mechanism b are connected by a sixth pull rod assembly 17, and specifically: one end of the sixth pull rod assembly 17 is connected with the first axle right transitional rocker arm 10 of the first axle disconnected trapezoidal mechanism a by means of a spherical hinge, and the other end of the sixth pull rod assembly 17 is connected with the second axle right transitional rocker arm 20 of the second axle disconnected trapezoidal mechanism b by means of a spherical hinge.

By adopting the configuration of the first axle disconnected trapezoidal mechanism a and the second axle disconnected trapezoidal mechanism b, it can ensure that each wheel is not influenced by hopping up and down of the wheel at the other side, a uniform steering force is provided to each wheel, and the vehicle is offered the steering capability for various places.

FIG. 1 also shows a specific embodiment of the steering output mechanism of the present invention. In the embodiment, the steering output mechanism may include a steering wheel, an angle drive 1, a steering drive shaft 2, a steering gear 3, a steering plumbing arm 4, a first pull rod assembly 5, a first rocker arm assembly 6 and a second pull rod assembly 7.

As shown in FIG. 1, the steering wheel is connected to the angle drive 1, one end of the steering drive shaft 2 is connected with the angle drive 1, and the other end of the steering drive shaft 2 is connected with an input shaft of the steering gear 3; the steering plumbing arm 4 is arranged on an output shaft of the steering gear 3; one end of the first pull rod assembly 5 is connected with the steering plumbing arm 4, and the other end of the first pull rod assembly 5 is connected with one end of the first rocker arm assembly 6; the other end of the first rocker arm assembly 6 is connected with one end of the second pull rod assembly 7 by means of a spherical hinge; and the other end of the second pull rod assembly 7 is connected with the first axle left transitional rocker arm 12 of the adjacent first axle disconnected trapezoidal mechanism a by means of a spherical hinge.

The steering hydraulic assisting system of the present invention includes a steering assisting oil cylinder that provides a steering assisting force to a wheel at the left side and/or a wheel at the right side of the related axle, and specifically a steering assisting oil cylinder may be arranged on the transitional rocker arm of the left wheel steering mechanism and/or the transitional rocker arm of the right wheel steering mechanism on at least one axle.

FIG. 1 shows a specific embodiment in which steering assisting oil cylinders are arranged on both the transitional rocker arms of the left wheel steering mechanisms and the transitional rocker arms of the right wheel steering mechanisms for two axles. In the embodiment, totally four steering assisting oil cylinders are included, namely a first axle left steering assisting oil cylinder 15, a first axle right steering assisting oil cylinder 16, a second axle left steering assisting oil cylinder 25 and a second axle right steering assisting oil cylinder 26, which are specifically configured as follows.

As shown in FIG. 1, one end of the first axle left steering assisting oil cylinder 15 is connected with the first axle left transitional rocker arm 12 by means of a spherical hinge, and the other end thereof is connected with a bracket welded to the vehicle frame by means of a spherical hinge, to provide a steering hydraulic assisting force to the wheel at the left side of the first axle. Furthermore, one end of the first axle right steering assisting oil cylinder 16 is connected with the first axle right transitional rocker arm 10 by means of a spherical hinge, and the other end thereof is connected with a bracket welded to the vehicle frame by means of a spherical hinge, to provide a steering hydraulic assisting force to the wheel at the right side of the first axle.

As shown in FIG. 1, one end of the second axle left steering assisting oil cylinder 25 is connected with the second axle left transitional rocker arm 22 by means of a spherical hinge, and the other end thereof is connected with a bracket welded to the vehicle frame by means of a spherical hinge, to provide a steering hydraulic assisting force to the wheel at the left side of the second axle. Furthermore, one end of the second axle right steering assisting oil cylinder 26 is connected with the second axle right transitional rocker arm 20 by means of a spherical hinge, and the other end thereof is connected with a bracket welded to the vehicle frame by means of a spherical hinge, to provide a steering hydraulic assisting force to the wheel at the right side of the second axle.

The technical solution of the steering system shown in FIG. 1 may be used for steering of two front axles (two front axles of the vehicle) of a wheel-type heavy vehicle, not only can ensure that the left wheels and the right wheels rotate according to Acherman's theory, but also can ensure that a wheel side at one side is not influenced by hopping up and down of a wheel side at the other side.

During specific implementation, modifications or additions may also be made based on the technical solution shown in FIG. 1, to achieve steering of one or more axles of a wheel-type heavy vehicle.

In order to provide a sufficient steering assisting force, the steering assisting oil cylinder of the steering hydraulic assisting system of the present invention may be supplied with oil through at least one steering pump, and steering gears for changing over the flow direction of pressure oil may be provided on hydraulic oil circuits between the steering assisting oil cylinder and the steering pump and between the steering assisting oil cylinder and an oil tank. On the hydraulic oil circuit of the steering assisting oil cylinder may also be provided an emergency pump and a switching valve for switching between an oil supply circuit of the emergency pump and an oil supply circuit of the steering pump.

Figure 2:
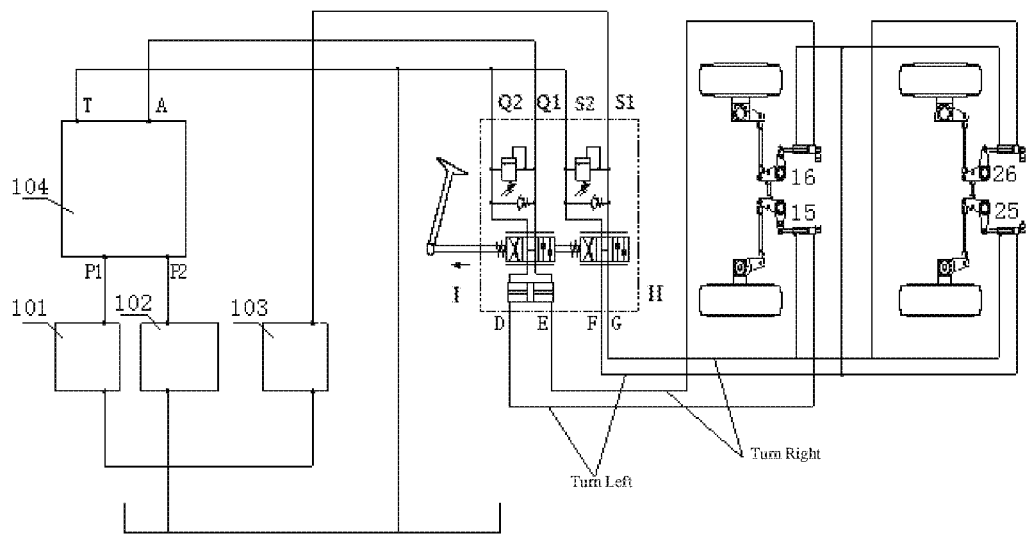
FIG. 2 is a structure diagram of a steering hydraulic assisting system of the present invention.

FIG. 2 shows a specific embodiment of a steering hydraulic assisting system. The configuration shown in the embodiment is applicable to the steering mechanism shown in FIG. 1.

The steering hydraulic assisting system shown in FIG. 1 may include at least two steering circuits, namely a first steering circuit and a second steering circuit respectively, and the working principle of the first steering circuit and the second steering circuit is as follows.

When the vehicle turns left, the first steering circuit and the second steering circuit control the first axle left steering assisting oil cylinder 15 to extend, the first axle right steering assisting oil cylinder 16 to retract, the second axle left steering assisting oil cylinder 25 to extend, and the second axle right steering assisting oil cylinder 26 to retract.

When the vehicle turns right, the first steering circuit and the second steering circuit control the first axle left steering assisting oil cylinder 15 to retract, the first axle right steering assisting oil cylinder 16 to extend, the second axle left steering assisting oil cylinder 25 to retract, and the second axle right steering assisting oil cylinder 26 to extend.

By adopting the above double-circuit steering assisting system, each wheel may be provided a uniform steering assisting force, to meet the requirement of "4. 2. 7 Steering System" in EU regulations EN 13000:2004 Crane—Mobile Crane.

The first steering circuit may include a first steering pump 102, a switching valve 104, a first steering gear control valve I, the first axle left steering assisting oil cylinder 15 and the first axle right steering assisting oil cylinder 16.

The second steering circuit may include a second steering pump 103, a second steering gear control valve II, the first axle left steering assisting oil cylinder 15, the first axle right steering assisting oil cylinder 16, the second axle left steering assisting oil cylinder 25 and the second axle right steering assisting oil cylinder 26.

An oil inlet of the first steering pump 102 is communicated with an oil tank, and an oil outlet of the first steering pump 102 is communicated with a second oil port P2 of the switching valve 104; a third oil port A of the switching valve 104 is communicated with a first oil port Q1 of the first steering gear control valve I; and a fourth oil port T of the switching valve 104 is communicated with the oil tank, a second oil port Q2 of the first steering gear control valve I and a second oil port S2 of the second steering gear control valve II respectively;

an oil inlet of the second steering pump 103 is communicated with the tank, and an oil outlet of the second steering pump 103 is communicated with an first oil port S1 of the second steering gear control valve II;

a third oil port D of the first steering gear control valve I is communicated with a rodless cavity of the first axle left steering assisting oil cylinder 15, and a fourth oil port E of the first steering gear control valve I is communicated with a rodless cavity of the first axle right steering assisting oil cylinder 16;

a third oil port F of the second steering gear control valve II is communicated with a rodless cavity of the second axle left steering assisting oil cylinder 25, a rod cavity of the second axle right steering assisting oil cylinder 26 and a rod cavity of the first axle right steering assisting oil cylinder 16 respectively; a fourth oil port G of the second steering gear control valve II is communicated with a rod cavity of the first axle left steering assisting oil cylinder 15, a rod cavity of the second axle left steering assisting oil cylinder 25 and a rodless cavity of the second axle right steering assisting oil cylinder 26 respectively.

On the first steering circuit is also provided an emergency device for providing a steering assisting force to the first steering circuit immediately after an accident or failure occurs to a steering main oil circuit (main oil circuit provided by the steering oil pump). The emergency device includes an emergency pump 101, an oil inlet of the emergency pump 101 being communicated with the oil tank, and an oil outlet of the emergency pump 101 being communicated with a first oil port P1 of the switching valve 104.

The steering hydraulic assisting system shown in FIG. 2 may also be modified in the present invention, specifically as follows.

The first steering circuit may include a first steering pump 102, an emergency pump 101, a switching valve 104, a first steering gear control valve I, a first axle left steering assisting oil cylinder 15 and a first axle right steering assisting oil cylinder 16.

The second steering circuit may include a second steering pump 103, a second steering gear control valve II, a first axle right steering assisting oil cylinder 16 and a second axle right steering assisting oil cylinder 26.

The working principle of the modified steering hydraulic assisting system is the same as that of the steering hydraulic assisting system shown in FIG. 2.

The steering mechanism and the steering hydraulic assisting system provided by the steering system in each of the above embodiments may be used for providing a steering force and a steering assisting force to wheels of a front axle. In order to provide maneuverability and curved-road maneuverability of the vehicle, the steering system of the present invention may also include a rear axle steering control device for providing a steering force to a rear axle of a wheel-type heavy vehicle as well.

The rear axle steering control device of the present invention may include a rear axle trapezoidal mechanism and a hydraulic power system providing a steering force to the rear axle trapezoidal mechanism. The rear axle trapezoidal mechanism may also be a disconnected trapezoidal mechanism, which may include a rear axle left wheel steering mechanism and a rear axle right wheel steering mechanism that correspondingly provide a torque to the wheel at the left side and the wheel at the right side of the rear axle respectively. The rear axle right wheel steering mechanism and the rear axle left wheel steering mechanism may be connected by a pull rod assembly. The hydraulic power system may include a steering oil cylinder arranged on the rear axle left wheel steering mechanism and/or the rear axle right wheel steering mechanism, and a hydraulic oil circuit and a valve control device corresponding to the steering oil cylinder.

Each of the rear axle left wheel steering mechanism and the rear axle right wheel steering mechanism may include a rear axle trapezoidal arm and a rear axle transitional rocker arm. The rear axle trapezoidal arm and the rear axle transitional rocker arm may be connected by a pull rod assembly and power is transferred therebetween. The rear axle transitional rocker arm of the rear axle left wheel steering mechanism and the rear axle transitional rocker arm of the rear axle right wheel steering mechanism may be connected by a pull rod assembly and power is transferred therebetween. The steering oil cylinder may be provided on the rear axle transitional rocker arm of the rear axle left wheel steering mechanisms and/or the rear axle transitional rocker arm of the rear axle right wheel steering mechanism.

The rear axle steering control device of the present invention enables flexible steering and driving of the wheel-type heavy vehicle, to meet the need of steering during driving in various places.

Figure 3:
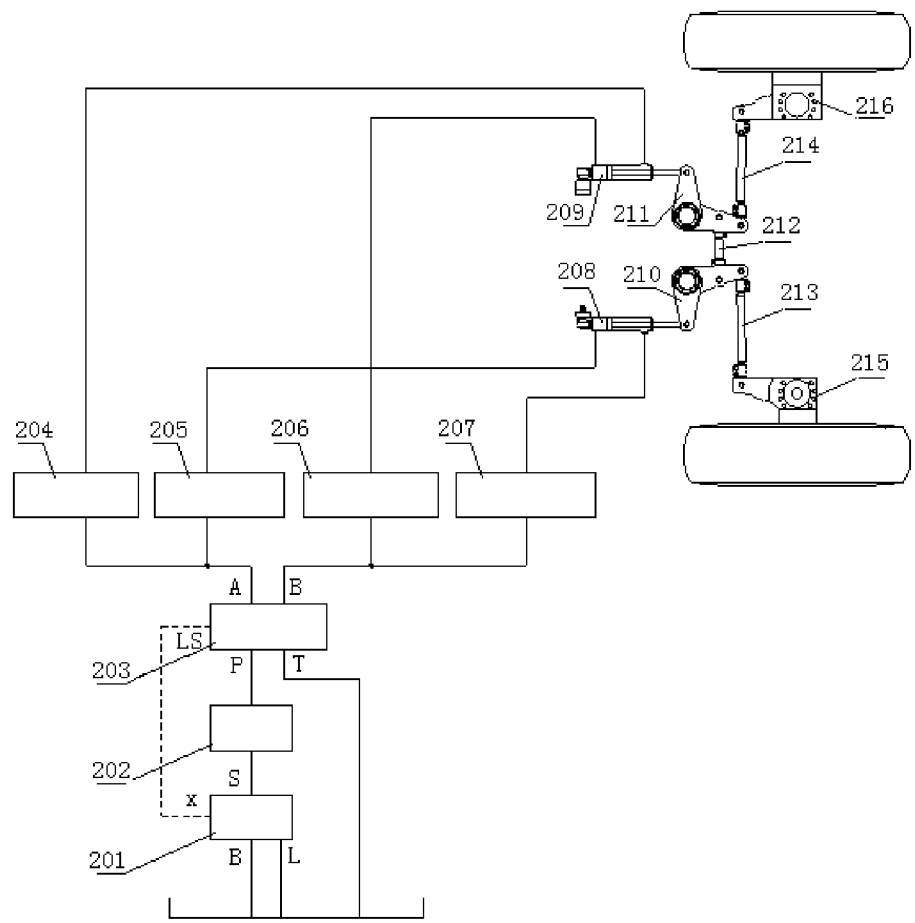
FIG. 3 is a structure diagram of a rear axle steering control device of the present invention.

FIG. 3 illustrates a specific embodiment of the rear axle trapezoidal mechanism of the present invention. The rear axle trapezoidal mechanism in the embodiment includes a rear axle left transitional rocker arm 210, a left steering pull rod assembly 213, a rear axle left trapezoidal arm 215, a rear axle right transitional rocker arm 211, a right steering pull rod assembly 214, a rear axle right trapezoidal arm 216 and a middle transitional pull rod assembly 212.

The rear axle left trapezoidal arm 215 is arranged on the left wheel for the rear axle; the rear axle left trapezoidal arm 215 is connected to one end of the left steering pull rod assembly 213; and the other end of the left steering pull rod assembly 213 is connected to the rear axle left transitional rocker arm 210.

The rear axle right trapezoidal arm 216 is arranged on the right wheel for the rear axle; the rear axle right trapezoidal arm 216 is connected to one end of the right steering pull rod assembly 214; and the other end of the right steering pull rod assembly 214 is connected to the rear axle right transitional rocker arm 211.

The rear axle left transitional rocker arm 210 and the rear axle right transitional rocker arm 211 are connected by the middle transitional pull rod assembly 212.

The hydraulic power system of the present invention may include a steering oil cylinder arranged on the rear axle left wheel steering mechanism and/or the rear axle right wheel steering mechanism. The steering oil cylinder may be supplied with oil through a variable displacement pump. Proportional valve sets for changing over the flow direction of pressure oil may be provided on hydraulic oil circuits between the steering oil cylinder and the variable displacement pump and between the steering oil cylinder and an oil tank. Hydraulic fluid is directed to the proportional valve set via the variable displacement pump, and reversal of the oil circuit is controlled by the proportional valve set, to achieve left steering or right steering of the rear axle.

On a hydraulic oil circuit between a working oil port of the proportional valve set and a working cavity of the steering oil cylinder may also be provided a lock valve set for controlling on and off states of the hydraulic oil circuit between the working oil port of the proportional valve set and the working cavity of the steering oil cylinder.

In a steering state, hydraulic fluid passing through the proportional valve set is controlled by the lock valve set to enter the working cavity of the steering oil cylinder; and in a non-steering state, hydraulic fluid passing through the proportional valve set is cut off by the lock valve set to prevent the hydraulic fluid from entering the working cavity of the steering oil cylinder.

FIG. 3 shows a specific embodiment of a hydraulic power system. In the embodiment, on both the rear axle left transitional rocker arm of the rear axle left wheel steering mechanism and the rear axle right transitional rocker arm of the rear axle right wheel steering mechanism are provided steering oil cylinders, namely a left steering oil cylinder 208 and a right steering oil cylinder 209 respectively. In the embodiment, a variable displacement pump 201, a filter 202, a proportional valve set 203, a first lock valve set 204, a second lock valve set 205, a third lock valve set 206 and a fourth lock valve set 207 are also included.

As shown in FIG. 3, the connection of the hydraulic oil circuit in the hydraulic power system is as follows: an oil inlet B and an oil drain port L of the variable displacement pump 201 are both communicated with an oil tank; an oil outlet S of the variable displacement pump 201 is connected with an oil inlet of the filter 202; an oil outlet of the filter 202 is connected with a first oil port P of the proportional valve set 203; a second oil port T of the proportional valve set 203 is communicated with the oil tank; a third oil port A of the proportional valve set 203 is connected with oil inlets of the first lock valve set 204 and the second lock valve set 205; and a fourth oil port B of the proportional valve set 203 is connected with oil inlets of the third lock valve set 206 and the fourth lock valve set 207, an oil outlet of the first lock valve set 204 is communicated with a rod cavity oil port of the right steering oil cylinder 209; an oil outlet of the second lock valve set 205 is communicated with a rodless cavity oil port of the left steering oil cylinder 208; an oil outlet of the third lock valve set 206 is communicated with a rodless cavity oil port of the right steering oil cylinder 209; and an oil outlet of the fourth lock valve set 207 is communicated with a rod cavity oil port of the left steering oil cylinder 208.

The proportional valve set 203 in this embodiment also has a load feedback port LS, which is communicated with a control port X of the variable displacement pump 201.

The working process of driving the rear axle for steering by the hydraulic power system shown in FIG. 3 is as follows: in steering of the rear axle, the proportional valve set 203 is controlled to implement the circuit: the first oil port P→the third oil part A, the fourth oil port B→the second oil port T of the proportional valve set 203, or the circuit: the first oil port P→the fourth oil port B, the third oil part A→the second oil port T of the proportional valve set 203, to achieve left steering/right steering of the rear axle, and an oil inlet and an oil outlet of a solenoid in each of the first lock valve set 204, the second lock valve set 205, the third lock valve set 206 and the fourth lock valve set 207 are communicated. When the rear axle needs to keep in a steering neutral position and is no longer involved in steering, a valve core of the proportional valve set 203 returns to a neutral position, and the oil inlet and the oil outlet of the solenoid valve in each of the first lock valve set 204, the second lock valve set 205, the third lock valve set 206 and the fourth lock valve set 207 are not communicated, that is, pressure oil output by the variable displacement pump 201 no longer enters the steering oil cylinders.

In FIG. 3, each of the first lock valve set 204, the second lock valve set 205, the third lock valve set 206 and the fourth lock valve set 207 has at least two working states. In a first working state, pressure oil from the third oil port A or the fourth oil port B of the proportional valve set 203 may enter a rod cavity or a rodless cavity of a steering oil cylinder through an oil inlet of a lock valve set. In a second working state, pressure oil from the third oil port A or the fourth oil port B of the proportional valve set 203 is cut off, and may not enter a rod cavity or a rodless cavity of a steering oil cylinder through an oil inlet of a lock valve set 203.

Figure 4:
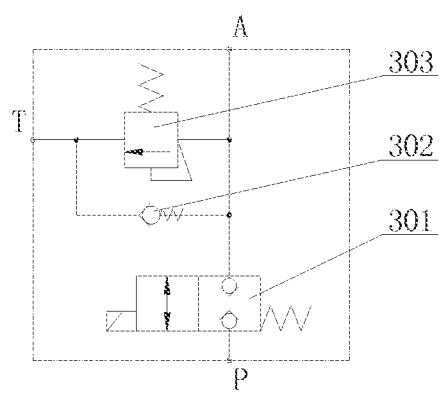
FIG. 4 is a structure diagram of an embodiment of a locking valve set shown in FIG. 3.

FIG. 4 shows a schematic diagram of a specific embodiment of the first lock valve set 204, the second lock valve set 205, the third lock valve set 206 and/or the fourth lock valve set 207. In the embodiment, the lock valve set may include a two-position two-way solenoid valve 301, an overflow valve 303 and a check valve 302, wherein an oil inlet of the two-position two-way solenoid valve 301 is communicated with a working oil port of the proportional valve set 203; an oil outlet of the two-position two-way solenoid valve 301 is communicated with an oil outlet of the check valve 302, an oil inlet of the overflow valve 303 and the working cavity of the steering oil cylinder; and an oil outlet of the overflow valve 303 and an oil inlet of the check valve 302 are both communicated with an oil tank.

In FIG. 3, alternatively, one of the first lock valve set 204, the second lock valve set 205, the third lock valve set 206 and the fourth lock valve set 207 may be selectively omitted.

In FIG. 3, the proportional valve set 203 may be provided with a control port LS, and the proportional valve set 203 has at least three working states. In a first working state, the first oil port P, the third oil port A, the fourth oil port B and the second oil port T of the proportional valve set 203 are not communicated with each other. In a second working state, the first oil port P and the fourth oil port B of the proportional valve set 203 are communicated with each other, and the third oil port A and the second oil port T are communicated with each other. In a third working state, the first oil port P and the third oil port A are communicated with each other, and the fourth oil port B and the second oil port T are communicated with each other. The control port LS may be used for detecting a control port oil pressure of a pressure-compensated valve located behind the proportional valve set 203.

Figure 5:
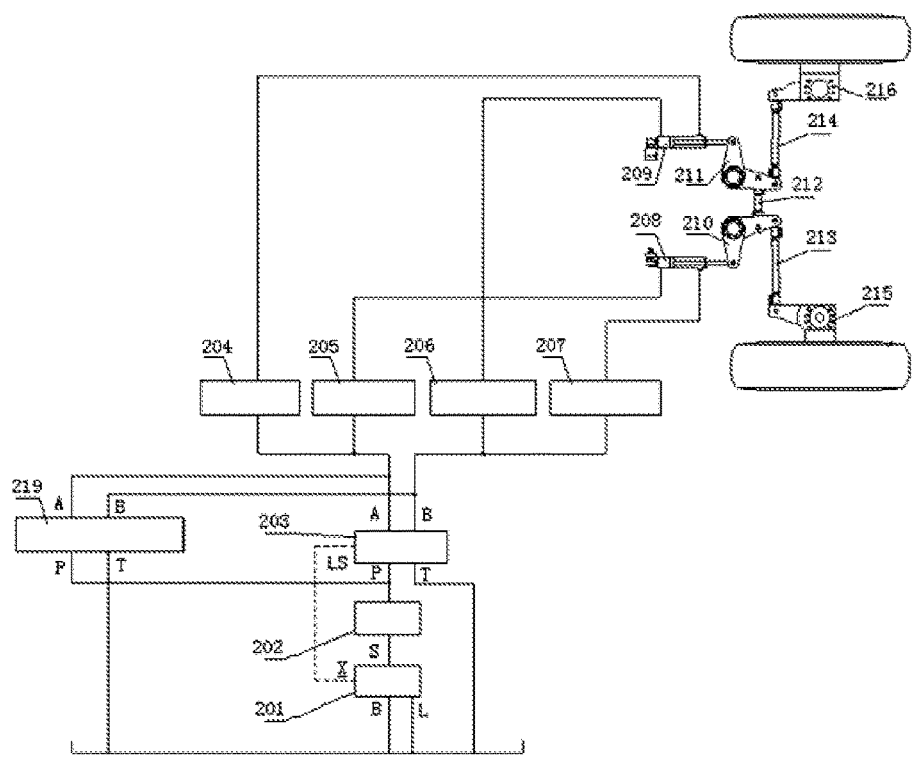
FIG. 5 is a structure diagram of a proportional valve set shown in FIG. 3 with a bypass circuit.

In FIG. 3, on the hydraulic circuits between the steering oil cylinder and the variable displacement pump and between the steering oil cylinder and an oil tank may also be provided bypass circuits (as shown in FIG. 5) for the proportional valve set for manually or automatically turning on a bypass steering circuit when failure occurs to the proportional valve set, to adjust the rear axle in failure to a steering neutral state.

As shown in FIG. 5, a three-position four-way solenoid valve 219 is provided on the bypass circuit, and a first oil port P, a third oil port A and a fourth oil port B of the three-position four-way solenoid valve 219 are correspondingly communicated with the first oil port P, the third oil port A and the fourth oil port B of the proportional valve set 203 respectively. A second oil port T of the three-position four-way solenoid valve 219 is communicated with the oil tank. During normal steering of the rear axle, the bypass three-position four-way solenoid valve 219 does not work.

In FIG. 5, different oil sources may also be adopted for the proportional valve set 203 and the three-position four-way solenoid valve 219 to achieve the above solution. To eliminate the probability that the rear axle may be subjected to deflected steering under the action of ground impact force or other external force, the lock valve sets described above may be added between the steering oil cylinders and the proportional valve set and between the steering oil cylinders and the three-position four-way solenoid valve respectively, or a bidirectional hydraulic lock may be provided to achieve a locking state of the steering neutral position.

The present invention further provides an independent suspension wheel-type heavy vehicle, which includes a steering system in the above embodiments.

Figure 6:
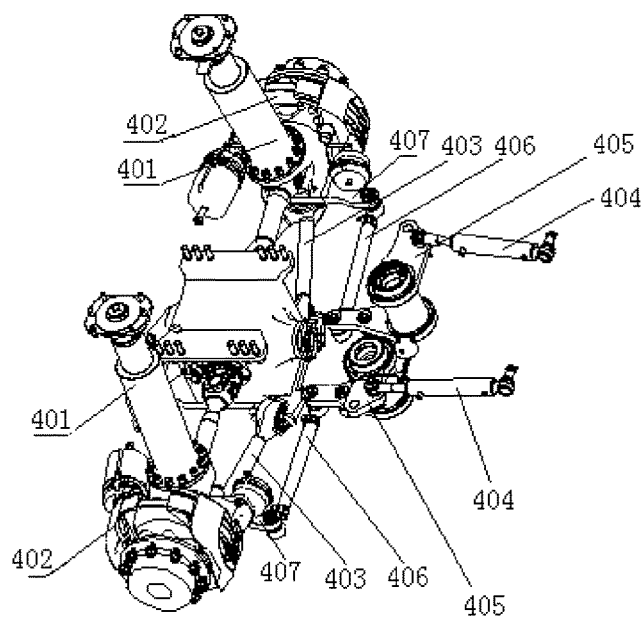
FIG. 6 is a schematic diagram of an overall structure of an independent suspension wheel-type heavy vehicle of the present invention.

FIG. 6 shows an independent suspension wheel-type heavy vehicle of the present invention, including a left/right oil-gas suspension oil cylinder 401, a left/right wheel side 402 and a left/right thrust rod 403. The steering system of the present invention is used in the independent suspension wheel-type heavy vehicle, and includes a left/right steering assisting oil cylinder 404, a left/right transitional arm 405, a left/right pull rod assembly 406, a left/right trapezoidal arm 407, etc., wherein the left/right trapezoidal arm 407 is connected with the left/right wheel side 402; and the left/right pull rod assembly 406 is connected with the left/right transitional arm 405 and the left/right trapezoidal arm 407 respectively by spherical hinges that allow a certain angular displacement.

When a wheel on a wheel side hops up or down, a suspension guide mechanism makes rotational movement about its two spatial hinge points fixed on the vehicle frame or a main reducer bracket, to drive the left/right trapezoidal arm 407 and the left/right pull rod assembly 406 into motion. The left/right pull rod assembly 406 is hinged by a spherical hinge and can ensure that the wheel side at one side is not influenced by hopping up and down of the wheel side at the other side, and can avoid the problems of wheel shimmy, poor handling stability, abnormal tire wear, etc.

Figure 7A:
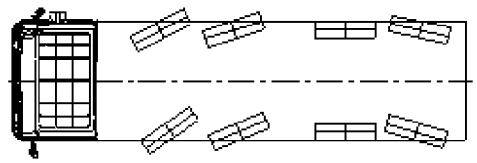
FIG. 7(a) is a schematic diagram of a normal road driving mode of the independent suspension wheel-type heavy vehicle of the present invention.
Figure 7B:
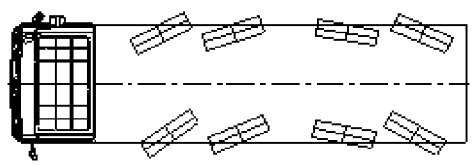
FIG. 7(b) is a schematic diagram of a sharp turn mode of the independent suspension wheel-type heavy vehicle of the present invention.
Figure 7C:
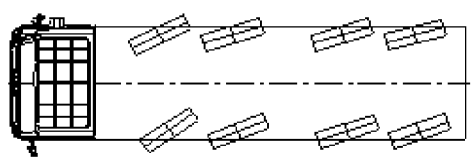
FIG. 7(c) is a schematic diagram of a crab mode of the independent suspension wheel-type heavy vehicle of the present invention.
Figure 7D:
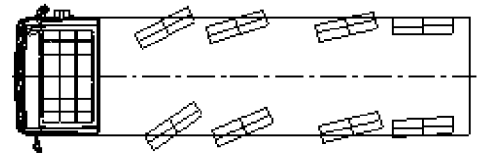
FIG. 7(d) is a schematic diagram of an anti-drift mode of the independent suspension wheel-type heavy vehicle of the present invention.

In the technical solution of the present invention, as shown in FIGS. 1, 2 and 3, the wheel-type heavy vehicle has various steering modes, such as a sharp turn mode (as shown in FIG. 7(b)), a crab mode (as shown in FIG. 7(c)), an anti-drift mode (as shown in FIG. 7(d)), etc., and has good maneuverability. Analysis is made below with reference to a specific embodiment.

In this embodiment, a steering control method of a chassis generally used in a four-axle vehicle is provided, the method including the following steps:

Steering of wheels arranged on a first axle and a second axle is driven by a steering wheel through a pull-rod steering drive mechanism and a disconnected trapezoidal mechanism respectively; (the steering mechanism and the steering hydraulic assisting system of the present invention are adopted for the first axle and the second axle).

Disconnected trapezoidal mechanisms on the third axle and the fourth axle are provided with steering oil cylinders respectively, and an extending end of each steering oil cylinder is hinged to the steering rocker arm of the corresponding disconnected trapezoidal mechanism; (the rear axle steering control device of the present invention is adopted for the third axle and the fourth axle).

The steering oil cylinders on the disconnected trapezoidal mechanisms for the third axle and the fourth axle are locked or unlocked according to the current steering mode of the vehicle, and the corresponding steering oil cylinders are controlled to drive the corresponding directive wheels for steering according to the rotational direction and the rotational angle of the first axle.

In the above method, it is determined that the vehicle is in a steering mode for its currently low-speed, intermediate-speed or high-speed road driving according to a vehicle speed signal.

It is determined that the vehicle is in a steering mode for its current working condition according to a user's selection, and working condition steering modes available for selection by a user includes three types, namely a sharp turn steering mode, a crab mode and an anti-drift mode.

Specifically, according to the respective steering mode, wheels on corresponding axles are controlled for steering correspondingly, with the precondition that the steering oil cylinders on the disconnected trapezoidal mechanisms on the corresponding axles are unlocked first.

As shown in FIG. 7(a), when the vehicle is in a low-speed road driving steering mode, each steering oil cylinder is unlocked, and each steering oil cylinder extends or retracts with the rotational direction and the rotational angle of the steering wheel, so that the steering direction of the wheels on the fourth axle is opposite to that of the wheels on the first axle, and the wheels on the third axles are not involved in steering;

When the vehicle is in an intermediate-speed or high-speed road driving steering mode, the steering oil cylinders on the third and fourth axles are locked, and steering of the wheels on the third and fourth axles is disabled.

As shown in FIG. 7(b), when the vehicle is in the sharp turn steering mode, each steering oil cylinder is unlocked, and each steering oil cylinder extends or retracts with the rotational direction and the rotational angle of the steering wheel, so that the steering direction of the wheels on the third and fourth axles is opposite to that of the wheels on the first and second axles.

As shown in FIG. 7(c), when the vehicle is in the crab mode, each steering oil cylinder is unlocked, and each steering oil cylinder extends or retracts with the rotational direction and the rotational angle of the steering wheel, so that the steering direction of the wheels on the third and fourth axles is the same as that of the wheels on the first and second axles.

As shown in FIG. 7(d), when the vehicle is in the anti-drift mode, each steering oil cylinder is unlocked, and each steering oil cylinder extends or retracts with the rotational direction and the rotational angle of the steering wheel, so that the steering direction of the wheels on the third axle is the same as that of the wheels on the first and second axles.

In the steering control method of the present invention, if the difference between the steering angle of any wheel on the first, second, third and fourth axles and a standard value corresponding to a steering angle characteristic curve of the wheel is detected to be larger than a set value, an alarm signal is emitted to prompt the driver to emergently stop the vehicle for checking.

An independent suspension wheel-type heavy vehicle of the present invention using the steering system in any of the above embodiments has multiple steering modes, and can meet the need for the vehicle to drive on road and move in a narrow place.

In the technical solutions of the present invention, those shown in FIGS. 1, 2 and 3 can be modified in such a manner that the disconnected trapezoidal mechanism is replaced by an integral steering trapezoidal mechanism, which is also applied to a non-independent suspension wheel-type heavy vehicle.

Finally it should be noted that the above embodiments are only intended to illustrate instead of limiting the technical solutions of the present invention; although the present invention has been described in detail with reference to the preferred embodiments, a person of ordinary skill in the art should understand that it is still possible to make modifications to the specific implementations of the present invention or equivalent substitutions to part of the technical features; and all of these modifications and equivalent substitutions should be encompassed within the scope of the technical solutions claimed by the present invention without departing from the spirit of the technical solutions of the present invention.

The invention claimed is:

1. A steering system, comprising a steering mechanism for providing a steering force to wheels and a steering hydraulic assisting system for providing a steering assisting force overcoming a steering resistance moment from the ground to the wheels;
   both the steering mechanism and the steering hydraulic assisting system are used for providing a steering force and a steering assisting force to wheels of a front axle, and the steering system further comprises a rear axle steering control device for providing a steering force to wheels on a rear axle;
   the rear axle steering control device comprises a trapezoidal mechanism and a hydraulic power system providing a steering force to the trapezoidal mechanism;
   the trapezoidal mechanism is a disconnected trapezoidal mechanism, which comprises a left wheel steering mechanism and a right wheel steering mechanism that correspondingly provide a torque to the wheel at the left side and the wheel at the right side of the rear axle respectively; the right wheel steering mechanism and the left wheel steering mechanism are connected by a tenth pull rod assembly; the hydraulic power system comprises a steering oil cylinder arranged on the left wheel steering mechanism or the right wheel steering mechanism, and a hydraulic oil circuit and a valve control device corresponding to the steering oil cylinder; and
   each of the left wheel steering mechanism and the right wheel steering mechanism comprises a trapezoidal arm and a transitional rocker arm; each of the trapezoidal arm and the transitional rocker arm are connected by an eleventh pull rod assembly and power is transferred therebetween; the transitional rocker arm of the left wheel steering mechanism and the transitional rocker arm of the right wheel steering mechanism are connected by the tenth pull rod assembly and power is transferred therebetween; and the steering oil cylinder is provided on the transitional rocker arm of the left wheel steering mechanisms or the transitional rocker arm of the right wheel steering mechanism.

2. The steering system of claim 1, wherein the steering mechanism comprises a steering output mechanism for outputting a torque;
   the steering output mechanism is connected to a trapezoidal mechanism of one axle, or is successively connected to trapezoidal mechanisms of multiple axles; through the trapezoidal mechanism, the steering output mechanism provides the torque to a wheel at the left side and a wheel at the right side of the related axle; and the steering hydraulic assisting system comprises a steering assisting oil cylinder that provides a steering assisting force to the wheel at the left side or the wheel at the right side of the related axle, and a hydraulic oil circuit and a valve control device corresponding to the steering assisting oil cylinder.

3. The steering system of claim 2, wherein the steering output mechanism is connected to the trapezoidal mechanism of the one axle, the trapezoidal mechanism of the axle being a disconnected trapezoidal mechanism, which comprises a left wheel steering mechanism and a right wheel steering mechanism that correspondingly provide the torque to the wheel at the left side and the wheel at the right side of the axle respectively; the right wheel steering mechanism and the left wheel steering mechanism are connected by the tenth pull rod assembly; and the left wheel steering mechanism or the right wheel steering mechanism is connected with the steering output mechanism by a connecting rod assembly and power is transferred therebetween.

4. The steering system of claim 3, wherein each of the left wheel steering mechanism and the right wheel steering mechanism comprises a trapezoidal arm and a transitional rocker arm; the trapezoidal arm and the transitional rocker arm are connected by the eleventh pull rod assembly and power is transferred therebetween; the transitional rocker arm of the left wheel steering mechanism and the transitional rocker arm of the right wheel steering mechanism are connected by the tenth pull rod assembly and power is transferred therebetween; and the transitional rocker arm of the left wheel steering mechanism or the transitional rocker arm of the right wheel steering mechanism is connected with the steering output mechanism by the connecting rod assembly and power is transferred therebetween.

5. The steering system of claim 4, wherein a steering assisting oil cylinder is arranged on the transitional rocker arm of the left wheel steering mechanism or the transitional rocker arm of the right wheel steering mechanism on the at least one axle.

6. The steering system of claim 5, wherein each of the tenth and eleventh pull rod assemblies and the steering assisting oil cylinders is configured to be connected by means of a spherical hinge.

7. The steering system of claim 2, wherein the steering output mechanism is successively connected to the trapezoidal mechanisms of the multiple axles, each of the trapezoidal mechanisms of the multiple axles being a disconnected trapezoidal mechanism, which comprises a left wheel steering mechanism and a right wheel steering mechanism that correspondingly provide the torque to the wheel at the left side and the wheel at the right side of the related axle respectively; the right wheel steering mechanism and the left wheel steering mechanism are connected by the tenth pull rod assembly; the left wheel steering mechanism or the right wheel steering mechanism of the disconnected trapezoidal mechanism adjacent to the steering output mechanism is connected with the steering output mechanism by the connecting rod assembly and power is transferred therebetween; and the disconnected trapezoidal mechanisms on adjacent axles of the multiple axles are connected by a twelfth pull rod assembly and power is transferred therebetween.

8. The steering system of claim 7, wherein each of the left wheel steering mechanism and the right wheel steering mechanism comprises a trapezoidal arm and a transitional rocker arm; the trapezoidal arm and the transitional rocker arm are connected by the eleventh pull rod assembly and power is transferred therebetween; the transitional rocker arm of the left wheel steering mechanism and the transitional rocker arm of the right wheel steering mechanism are connected by the tenth pull rod assembly and power is transferred therebetween; the transitional rocker arm of the left wheel steering mechanism or the transitional rocker arm of the right wheel steering mechanism of the disconnected trapezoidal mechanism adjacent to the steering output mechanism is connected with the steering output mechanism by the connecting rod assembly and power is transferred therebetween; the transitional rocker arms of the left wheel steering mechanisms or the transitional rocker arms of the right wheel steering mechanisms on the adjacent axles of the multiple axles are connected by the twelfth pull rod assembly and power is transferred therebetween.

9. The steering system of claim 2, wherein the steering output mechanism comprises an angle drive, a steering drive shaft, a steering gear, a first pull rod assembly, a first rocker arm assembly and a second pull rod assembly; one end of the steering drive shaft is connected with the angle drive, and the other end thereof is connected with an input shaft of the steering gear; the steering plumbing arm is arranged on an output shaft of the steering gear; the steering plumbing arm is connected with one end of the first pull rod assembly, and the other end of the first pull rod assembly is connected with one end of the first rocker arm assembly; and the other end of the first rocker arm assembly is connected with one end of the second pull rod assembly by means of a spherical hinge, and the other end of the second pull rod assembly is connected with the trapezoidal mechanism on the adjacent axle by means of a spherical hinge.

10. The steering system of claim 2, wherein the steering assisting oil cylinder is supplied with oil through at least one steering pump, and steering gears for changing over the flow direction of pressure oil are provided on hydraulic oil circuits between the steering assisting oil cylinder and the steering pump and between the steering assisting oil cylinder and an oil tank.

11. The steering system of claim 10, wherein an emergency pump and a switching valve for switching between an oil supply circuit of the emergency pump and an oil supply circuit of the steering pump are also provided on the hydraulic oil circuit of the steering assisting oil cylinder.

12. The steering system of claim 1, wherein the steering oil cylinder is supplied with oil through a variable displacement pump; proportional valve sets for changing over the flow direction of pressure oil are provided on hydraulic oil circuits between the steering oil cylinder and the variable displacement pump and between the steering oil cylinder and an oil tank; and reversal of the oil circuit is controlled by the proportional valve set, to achieve left steering or right steering of the rear axle.

13. The steering system of claim 12, wherein on a hydraulic oil circuit between a working oil port of the proportional valve set and a working cavity of the steering oil cylinder is also provided a lock valve set for controlling on and off states of the hydraulic oil circuit between the working oil port of the proportional valve set and the working cavity of the steering oil cylinder.

14. The steering system of claim 13, wherein the lock valve set comprises a two-position two-way solenoid valve, an overflow valve and a check valve, wherein an oil inlet of the two-position two-way solenoid valve is communicated with a working oil port of the proportional valve set; an oil outlet of the two-position two-way solenoid valve is communicated with an oil outlet of the check valve, an oil inlet of the overflow valve and the working cavity of the steering oil cylinder; and an oil outlet of the overflow valve and an oil inlet of the check valve are both communicated with an oil tank.

15. The steering system of claim 12, wherein on the hydraulic circuits between the steering oil cylinder and the variable displacement pump and between the steering oil cylinder and an oil tank is also provided a bypass circuit for the proportional valve set for manually or automatically adjusting the rear axle in failure to a steering neutral state after failure occurs to the proportional valve set; and a three-position four-way solenoid valve is provided on the bypass circuit.

16. An independent suspension wheel-type heavy vehicle, comprising the steering system of claim 1.

* * * * *